United States Patent [19]

Janotik et al.

[11] Patent Number: 5,064,046

[45] Date of Patent: Nov. 12, 1991

[54] FLEXIBLE CONVEYING DEVICE

[75] Inventors: Adam M. Janotik, Grosse Ile, Mich.; Derek F. Gentle, Danbury, United Kingdom

[73] Assignee: Ford Motor Company, Dearborn, Mich.

[21] Appl. No.: 597,213

[22] Filed: Oct. 15, 1990

[51] Int. Cl.⁵ ............................................. B65G 11/00
[52] U.S. Cl. ............................ 193/35 SS; 198/463.3; 198/592
[58] Field of Search ................ 193/35 SS, 35 MD; 198/463.3, 586, 535, 536, 592, 861.2, 861.3, 861.5, 782, 955; 414/276, 533, 534, 535

[56] References Cited

U.S. PATENT DOCUMENTS

| 4,711,342 | 12/1987 | Abraham | 198/955 X |
| 4,977,999 | 12/1990 | Smock | 193/35 SS |

FOREIGN PATENT DOCUMENTS

| 0101107 | 5/1965 | Denmark | 193/35 SS |
| 0172312 | 9/1984 | Japan | 193/35 SS |
| 0772958 | 11/1980 | U.S.S.R. | 193/35 SS |
| 1426899 | 9/1988 | U.S.S.R. | 193/35 SS |
| 1107679 | 3/1968 | United Kingdom | 193/35 SS |

*Primary Examiner*—H. Grant Skaggs
*Assistant Examiner*—Cheryl L. Gastineau
*Attorney, Agent, or Firm*—Joseph W. Malleck; Roger L. May

[57] ABSTRACT

A modulated conveyor shuttling system for transfering a pallet therealong. It has a series of pedestals aligned along a predetermined path, a carrier supported on each of the pedestals with a plurality of bearings to movingly support the pallet, and locomotion apparatus incorporating air bladders to effect sequential lifting, tilting, and lowering of adjacent carriers on adjacent modules to steppingly move the pallet along such path.

10 Claims, 5 Drawing Sheets

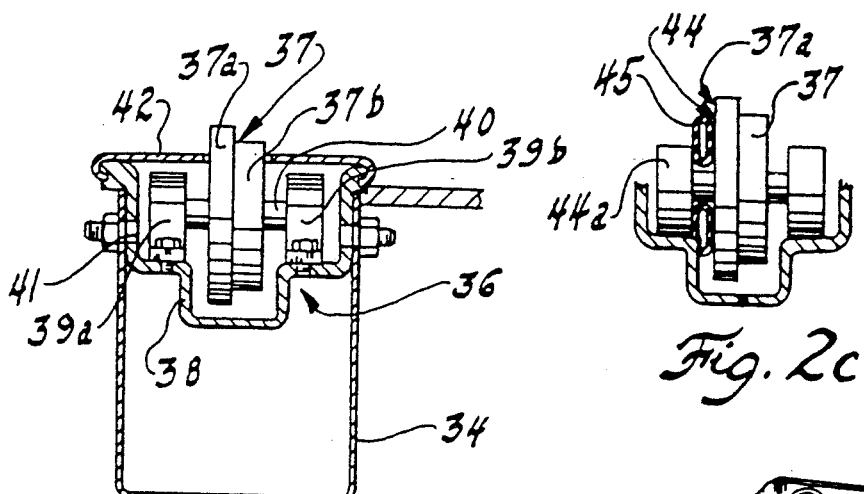
Fig. 2c
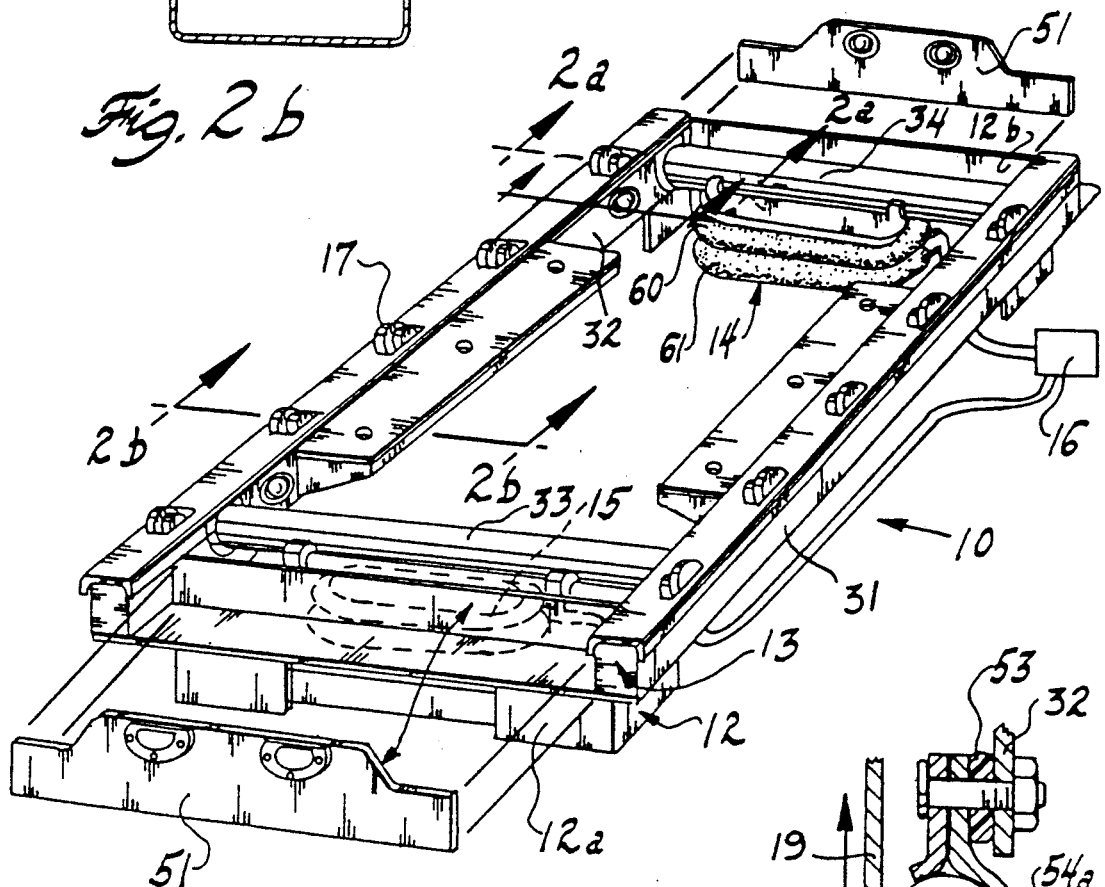
Fig. 2b
Fig. 1
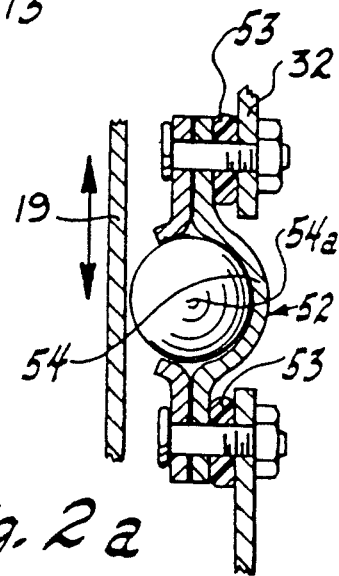
Fig. 2a

FLEXIBLE CONVEYING DEVICE

BACKGROUND OF THE INVENTION

1. Technical Field

This invention relates to the technology of movable load-supporting platforms, and more particularly to pallet conveying devices having roller elements.

2. Discussion of the Prior Art

Low friction load-supporting platforms facilitate the movement of goods within a manufacturing facility. Predominantly, the platforms have load-bearing conveyors with a large number of ball or roller elements projecting upwardly above the supporting members to movably support the goods or pallet containing the goods; such conveyors may have the roller elements powered to promote continuous movement of the goods. Such conveyors suffer from two inherent limitations: unidirectionality and inability to asynchronously stop and go at various stations along the conveyor without affecting the stream of goods.

With respect to alleviating the lack of independent stop and go, the prior art has attempted to use guided vehicles, linear induction motors, and zone control conveyors, all of which rely on complex and expensive electromechanical drives and control systems and thus share a history of extraordinarily high costs and/or inadequate reliability.

With respect to alleviating unidirectionality, the prior art has attempted to use rotary trays or raiseable diverter rails to change direction 90° at interruptions in or at the end of a conveyor line (see U.S. Pat. Nos. 3,011,665 and 4,798,275). This is disadvantageous because it limits bidirectionality to only specific turnoff stations and requires separately complex mechanisms.

More recent approaches comprise the use of inflatable bladders to lift a transverse roller deck into contact with a load pallet, and subsequently raise the pallet above longitudinally directed rollers, allowing the load to be moved transversely to the original direction of motion. This may be accomplished directly by manually moving the load pallet on such transverse rollers or indirectly by powering the transverse rollers such as disclosed in U.S. Pat. No. 4,747,477. It also may be accomplished by causing bladders to raise and push upwardly on the transverse carriage in a manner to cause the long flange of the carriage to engage part of the support and tilt encouraging gravity to move the goods (see U.S. Pat. No. 4,627,526). The problem associated with the attempt to use inflatable bladders is their limitation to dedicated directions and inability to achieve asynchronous stop and go.

What is needed is a flexible conveying device that provides for omnidirectional movement capability along with stop and go characteristics in a modularized system that is both low in cost and extremely durable.

SUMMARY OF THE INVENTION

The invention is a modulated conveyor shuttling system to transfer a pallet, the system including a series of pedestals aligned along a predetermined path, a carrier supported on each of the pedestals with suitable bearings thereon, and a locomotion means to effect sequential lifting, tilting, and lowering of adjacent carriers on the modules to steppingly move the pallet along the path. Preferably, the locomotion means includes pneumatic lifting elements in the form of bladders.

More particularly, an inventive combination comprises at least one pair of interchangeable omnidirectional material handling modules for transferring a pallet, each module comprising: (a) a base pedestal; (b) a carrier on and movable vertically relative to each pedestal, the carrier having a plurality of bearings to movingly support the pallet in more than one direction; (c) at least two sets of plural chamber inflatable bladders interposed between the pedestal and carrier and located at opposite sides of the carrier, the plural chambers being independently inflatable and each being additive vertically to select a desired vertical elevation; and (d) control means effective to inflate selective chambers of the sets of the module pairs to integrate their carriers along a common incline thus allowing a pallet to move between the pair of modules at least by gravity in the direction of incline.

Preferably, the control means is effective to restore the carriers of the pair of modules to a noninclined common plane and thereafter repeat the same sequence with one of such pair and a third module to steppingly move the pallet continuously among several modules.

SUMMARY OF THE DRAWINGS

The novel features of the invention are set forth with particularity in the appended claims. The invention itself, however, both as to its organization and method of operation, together with further objects and advantages thereof, may best be understood by reference to the following description taken in conjunction with the accompanying drawings, in which:

FIG. 1 is a perspective view of one material handling module embodying the Principles of this invention;

FIGS. 2a and 2b are enlarged sectional views taken respectively lines 2a—2a and 2b—2b of FIG. 1;

FIG. 2c is an alternative roller bearing assembly;

DETAILED DESCRIPTION AND BEST MODE

Figure 3:
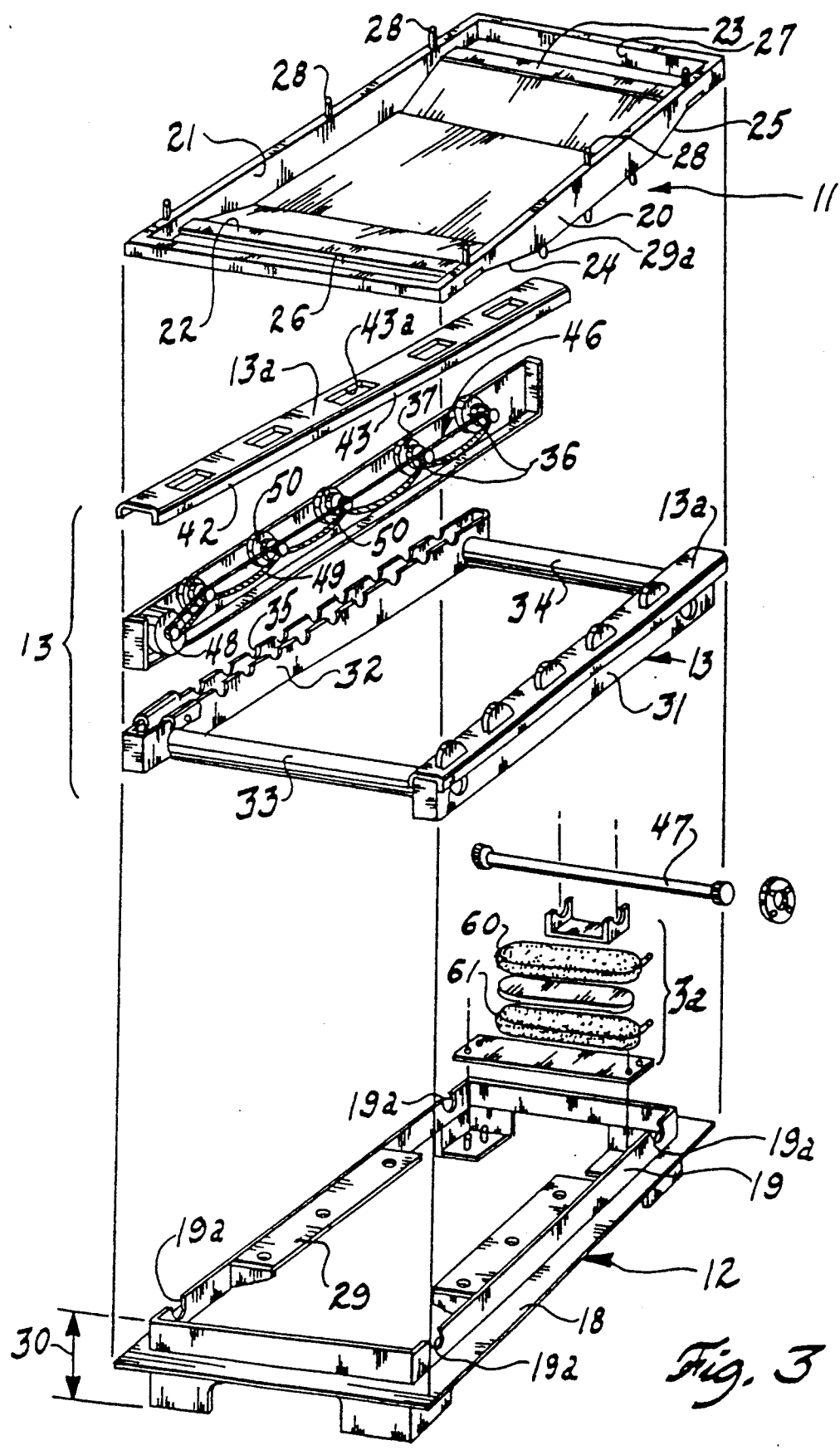
FIG. 3 is an exploded perspective view of some components of the device of FIG. 1.

As shown in FIGS. 1-3, a material handling module which, when arranged together in sequential pairs, perform in a unique manner. Each module 10 is comprised of a pedestal 12, a carrier 13, bladder stacks 14, 15, and control means 16 for selectively actuating the bladder stacks.

One or more pallets (see FIG. 3) are to be transferred across the upper bearings 17 of such modules. Each pallet 11 consists of two longitudinally extending runners 20, 21 connected by two transverse rails 22, 23 and two end bumper rails 26, 27 to form a rigid framework. Each of the runners has "sled-like" tapers 24, 25 adjacent the forward and rear ends of the pallet. The transverse rails are attached to the longitudinal runners at a sufficiently high location to completely clear the bearings 17 (which are roller assemblies) of the carrier when nested therein. Precision locating pins 28 are formed to project upwardly from the upper surface of the pallet runners and are designed to engage control holes in workpieces placed on the pallets to be transferred, such as in vehicle bodies on a vehicle manufacturing line. Each pallet may have locating pin sets to accommodate several different types of workpieces on the same pallet.

The pedestal 12 is preferably formed from sheet steel having a framework comprised of an outer circumferential flat flange 18 with an inner peripheral upright flange 19. Pairs of aligned receptacles 19a are notched into the upright flange 19 to seat cross members of the carrier 13. The pedestal may have horizontally inwardly extending mounts 29 for receiving vertically oriented locator pins 29a depending from the pallet rails to promote extremely accurate and precise station positioning of each pallet and its payload for assembly operations or fabricating operations to be performed on the payload at that station. The height (designated 30) of the pedestal is preferably equal to six inches as a minimum and up to a maximum height required for interfacing with other material handling devices.

The carrier 13 comprises a Pair of parallel longitudinal rails 31, 32 rigidly interconnected by transverse links 33, 34, thus forming a rectangular frame. The carrier frame is supported in pairs of aligned receptacles 19a with freedom to move in a vertical direction within such receptacles when properly actuated by the bladder stacks 14, 15. In the lowermost nested condition, the carrier 13 is designed to have roller bearing assemblies 36 project upwardly above the top surface 13a of the carrier and above the pedestal thereby to engage the runners 20, 21 of the pallet 11. The runners are cradled within such roller bearing assemblies because each roller 37 (see FIG. 2b) is stepped in configuration so that its outer flange 37a prevents the sled from moving sideways while portion 37b supports the runner load.

As shown in FIG. 2b, each rail 31, 32 is comprised of a U-shaped channel with aligned notches 35 at the upper edges to accept the roller bearing assemblies 36. Each roller bearing assembly 36 consists of an extruded aluminum frame 38 with studs 41 seated in said notches 35 of the channels; to the frame are secured two rolling contact bearing pillow blocks 39a, 39b carrying a short shaft 40 with the stepped roller 37 thereon. The stepped roller is made of steel, clad with hard urethane elastomer. The roller bearing assemblies allow payload pallets to roll in a direction transverse to shaft 40. An elastomer cover 43 may be used on each rail and secured by being snapped into grooves in the frame 38, the cover keeping out debris and dirt; the cover will have molded-in longitudinal slots 43a to allow rollers to protrude therethrough. Failed roller assemblies can be replaced in a manner of minutes with simple hand tools, reducing module downtime.

Each of the roller bearing assemblies may be substituted with a roller bearing assembly containing an air operated brake (as shown in FIG. 2c) for some or all of the roller assemblies. The air-actuated brake provides an optional means of controlling the speed on a gravity-powered conveyor. It comprises annular friction member 44 aligned with the end (friction surface 37a) of the stepped roller bearing 37. The friction member 44 is caused to frictionally engage the bearing 37 upon inflation of toroidal bladder 45 cradled at the side of the friction member tapered bearing 44a and the stepped bearing 37. The bladder 45 is actuated by very low inflation pressure.

A modular drive 46 (as shown in FIG. 3) may be added to power the rollers 37 of the base module eliminating reliance on gravity and providing either fixed or variable speed capability, depending on need. Drives of this type are commercially available; power can be supplied either by electric or pneumatic motors. Speed synchronization between rollers can be achieved either by means of shafting and bevel gearing, change and sprocket drive, or timing belt drives. The drive shown in FIG. 3 is of the chain and sprocket type utilizing a driveshaft 47 connected to a sprocket 48 which in turn has chains 49 connected to individual roller sprockets 50 for each of the roller assemblies.

Travel stop bars 51 (see FIG. 1) may be rigidly bolted to the ends 12a and 12b of the pedestal 12. They serve as Positive stops for each Pallet 11 after it is moved onto the module. Ball guides 52 (see FIG. 2a) may be secured to the pedestal side rails 31,32 and travel stop bars 51 to provide low friction constraint for the carrier's up and down motion (U-shaped channel) with respect to the pedestal flange 19. On the stop bars 51, the ball rollers 54a in the ball guides 54 are mounted with rubber cushions 53 to absorb forces generated by the impact of pallets with their payload.

The unique carrier lifting/tilting system is promoted by pneumatic lifting elements. In FIG. 1, at least two plural chamber inflatable bladders or bladder stacks 14, 15 are employed for longitudinal stepping or "inchworm" type of shuttling movement. The bladder stacks are placed under the transverse links 33, 34 of the carrier 13. The bladders are of a low pressure (i.e., 10-50 psi depending on load-imposed requirements), large footprint type. The footprint area may be in the range of 1-3 ft$^2$; if the pallet is carrying a 4000 pound vehicle with 10 psig bladder pressure, the footprint is likely to require no more than 400 in$^2$ or 3 ft$^2$ per lifting point. Each bladder stack has two chambers 60, 61 situated one on top of the other. The chambers are inflated independently of one another under the control of the separate electropneumatic valves forming part of control 16.

Figure 4:
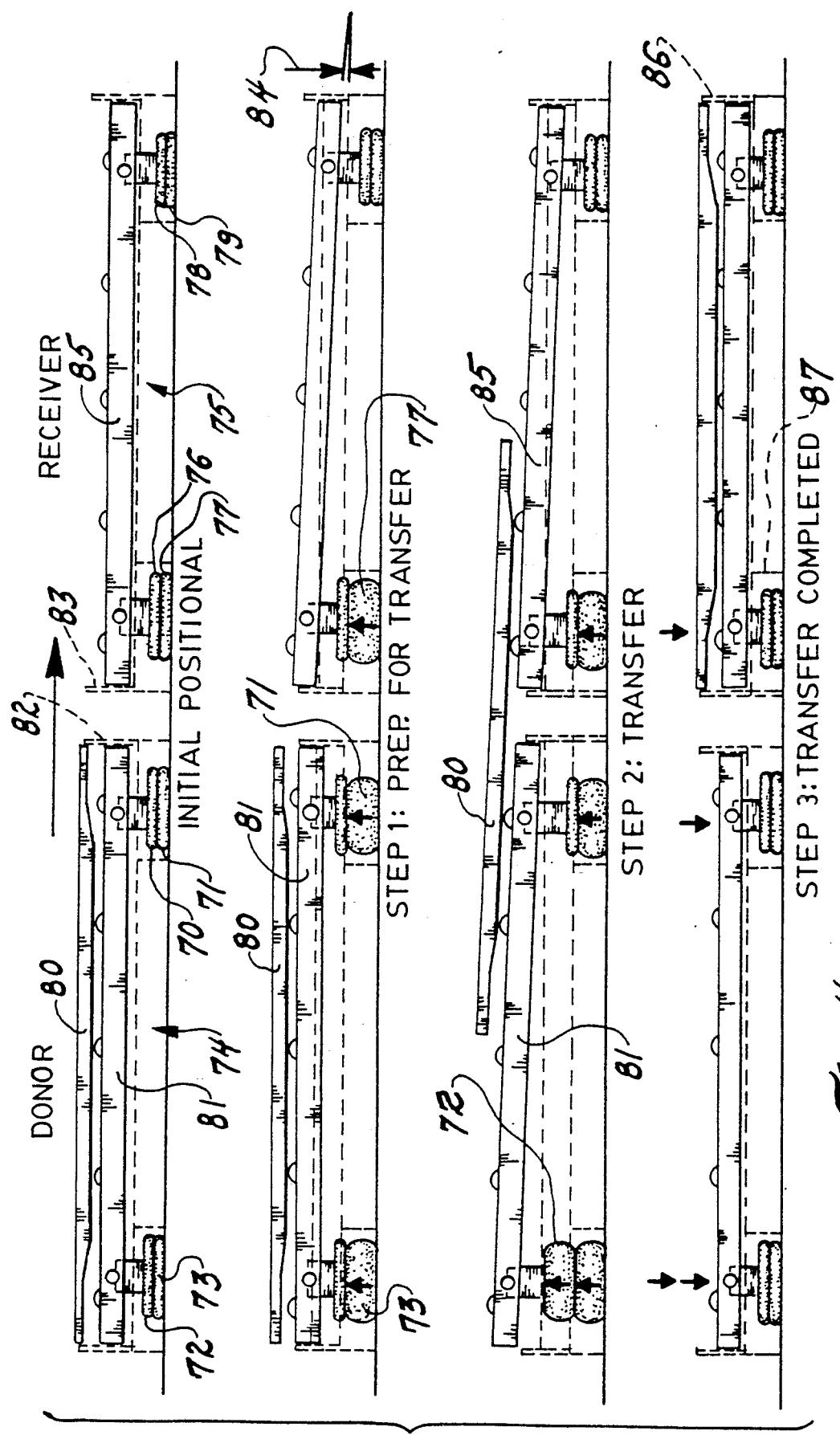
FIG. 4 is a composite view of sequential elevational views depicting the sequence of steps to effect pallet transfer along the modules.

In operation, and as shown in FIG. 4, the shuttling action takes place as follows. If the motion control 16 senses (by way of a mechanical or optical sensor located in the path of the pallet at a convenient location) the receiver module to be empty, a "go" signal is received from the area control computer, and if no manual override exists, the following sequence of actions will take place: (i) the three chambers (the lower leading and trailing bladders 71, 73 on the donor module 74 and the lower trailing bladder 77 on the receiver module 75) are inflated. The effect is to lift the pallet 80 and carrier 81 on the donor module 74 from the initial position to a level (step 1) where the pallet 80 clears the end stop bars 82, 83 and to establish a guide slope 84 on the receiver module 75. During the upward motion, the carrier 81 and pallet 80 are constrained by the ball guides 52 in the Pedestal frame and the carrier constrained by the end stop bars 82, 83; (ii) the upper chamber 72 of the trailing bladder on the donor module 74 is inflated, tilting the donor carrier 81 to a slope 84 and causing the pallet 80 with its cargo to slide forward by gravity onto the raised and tilted donor carrier 85 (see step 2). Acceleration and speed of the pallet 80 can be controlled by the inflated height of the upper bladder chamber 72 and by manipulating the inflation/deflation rate; (iii) when the pallet 80 comes into contact with the end stop bar 86 (step 3) on the receiver module 75, its sensor (located at the stop bar 86) signals to the control 16 that the receiver module is now occupied; this causes all bladders to deflate. Simultaneously, the mechanical feeler or optical sensor on module 74 declares it to be emptied of a pallet. The carrier 85 with the pallet and payload settles down on the pedestal frame 87. Locator pins 29a of the receiver module 75 engage the pallet to control positioning and the system is ready for a precision assembly task to be performed on its payload.

Figure 7:
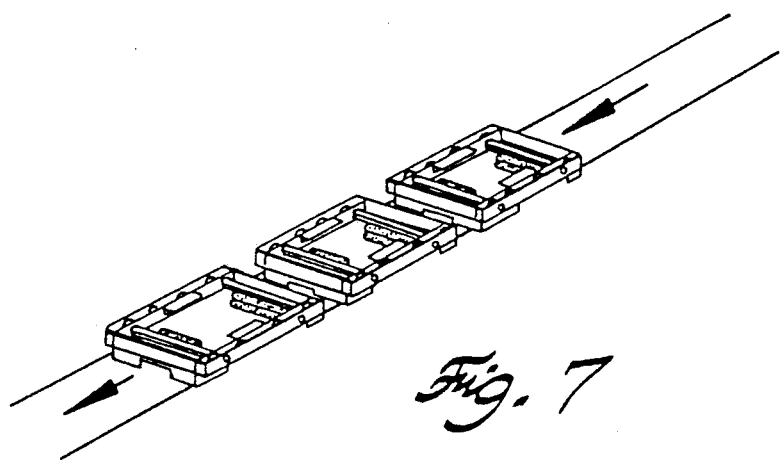
FIG. 7 is a perspective view of a conveyor line using the modules of this invention.

If a pallet is to transit several stations or modules in a rapid advance mode, the above sequence of action is repeated with the next module, e.g., the receiver module becoming the new donor module and the next module down the line becomes the new receiver module. The difference is that the new donor module does not deflate it trailing bladder because the "next module occupied" signal is not present. Instead, the lower chamber of the leading bladder of that module and the upper chamber of the trailing module are inflated in succession to keep the pallet shuttling down the line, much in the fashion of an inch-worm style but with greater speed. The process repeats until a "next module occupied" signal is received by the control system. A layout for Precision stop-and-go conveyor utilizing this elevate and tilt sequence is represented in FIG. 7.

Figure 5:
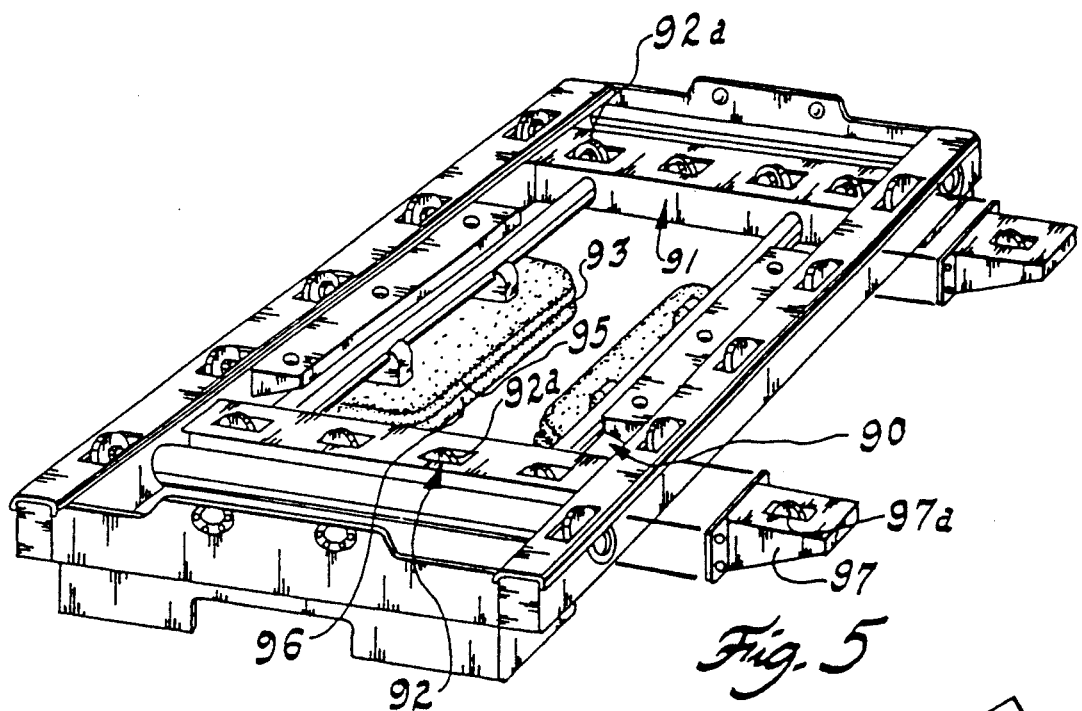
FIG. 5 is a perspective view of still another embodiment of this invention illustrating means for providing transverse movement.
Figure 6:
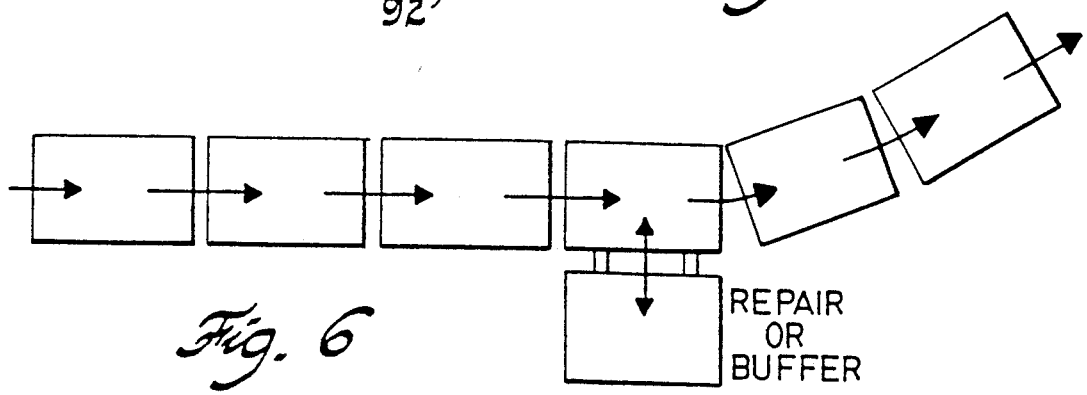
FIG. 6 is a diagramatical view of the path potential for the apparatus of FIG. 5.

To transfer material additionally in transverse directions, the addition of a transfer shuttling mechanism 90 is employed which is nested within the longitudinal carrier 13 but has its own bladder stacks 93, 94 (see FIG. 5). Thus, the basic module will also acquire the capability to shuttle pallets sideways, either to another module or to another material handling device. The transverse lifting carrier 91 is similar to the longitudinal carrier. It has the same stepped roller assemblies 92 which, in this case, provide transverse rolling action while the roller step 92a prevents side slipping along the longitudinal direction. The transverse lifting and tilting mechanism is actuated by the same type of stacked bladders in a manner analogous to that used by the longitudinal transfer mechanisms, each having upper chamber 95 and a lower chamber 96. Small "outriggers" 97 with rollers 97a, between two modules (which are not immediately adjacent to each other) should be used. This is necessary because in most automotive applications the goods to be transferred, such as auto bodies, are wider than the attachment points for the pallets. Thus, the material may be transferred along a multiple path arrangement, which may be linear or curvilinear, such as shown in FIG. 6, with stop-and-go capabilities.

When using the transverse carrier, it operates the same as a donor carrier in the previous operation, and a regular longitudinal carrier positioned at a right angle to the donor carrier functions as the receiving carrier. It is possible that the predetermined path for the modules could be curvilinear as long as the curve is gentle.

Figure 8:
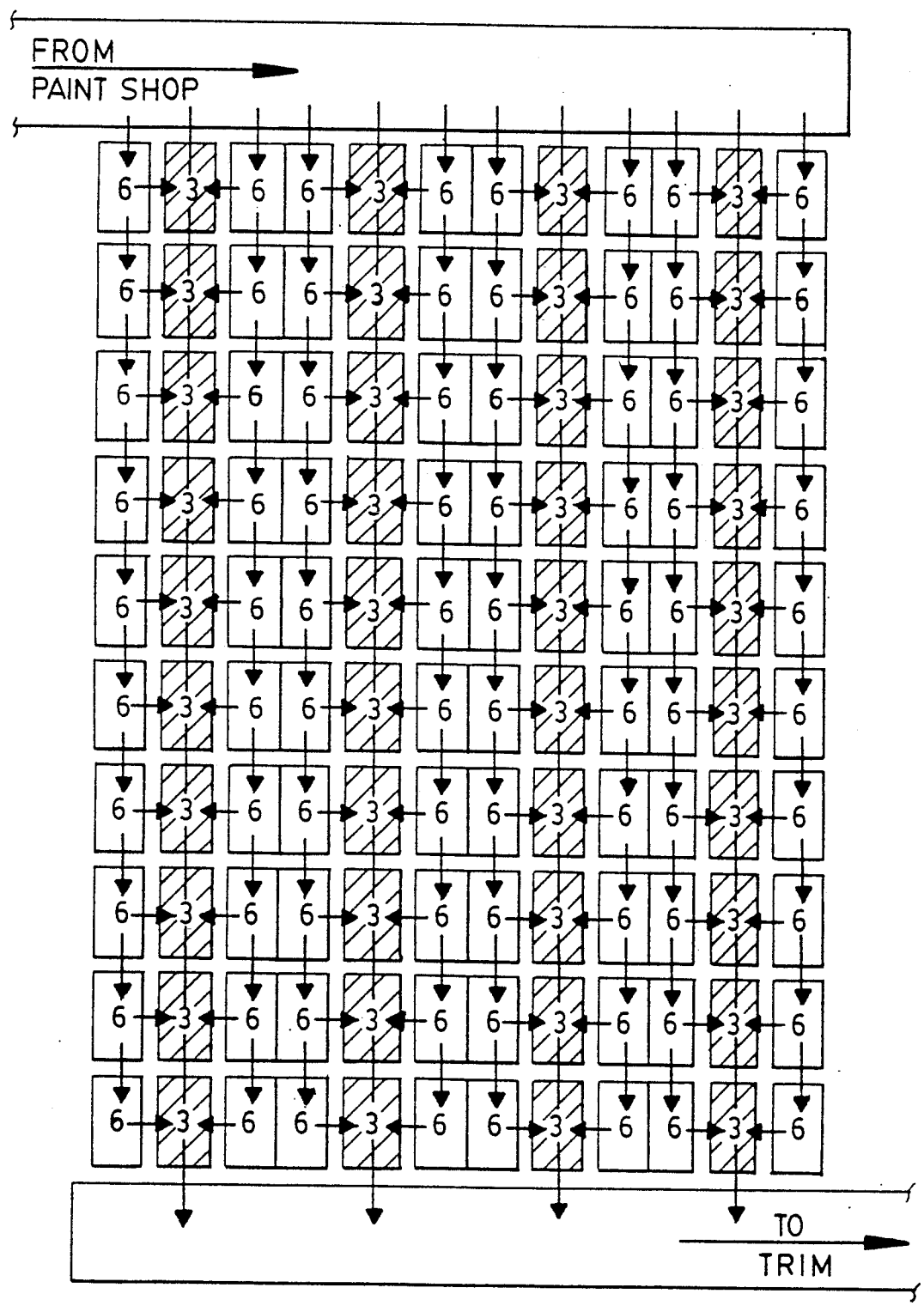
FIG. 8 is a diagramatic view of the multiple paths possible with use of modules constructed in accordance with this invention.

This invention is particularly useful for the construction of fast, random access, painted body banks in automotive assembly plants. Current body banks do not have the random access feature. As a result, they may contain large numbers of bodies, as many as 400, to support over 97% sequencing accuracy in trim and final lines. A high speed random access bank with "express" through-lanes offers the opportunity to reduce the number of bodies in process, scale down floor space requirements, utilize space unusable for conventional banks, and provide perfect sequencing. Because of the complexity and cost of conventional omnidirectional material systems, such as AGV's, no full-scale random access systems are known to have been commercially built. FIG. 8 shows one possible layout of a hypothetical fast random access body bank using this invention. The bank is constructed by stringing together twelve rows of modules, the unshaded module rows requiring side transfer capability and the shaded module rows requiring only longitudinal capability. The shaded module rows can serve as exit lanes for bodies and the unshaded module rows can serve as "express" through-lanes for bodies which do not require banking.

While particular embodiments of the invention have been illustrated and described, it will be obvious to those skilled in the art that various changes and modifications may be made without departing from the invention, and it is intended to cover in the appended claims all such modifications and equivalents as fall within the true spirit and scope of this invention.

We claim:

1. A modulated conveyor shuttling system to transfer a pallet therealong, comprising:
   (a) a series of pedestals aligned along a predetermined path;
   (b) a carrier supported on each of said pedestals and having a plurality of bearings to movingly support said pallet; and
   (c) locomotion means to effect sequential lifting, tilting, and lowering of adjacent carriers on adjacent modules to steppingly move said pallet along said path, said locomotion means comprising dual chamber inflatable bladders superimposed with one chamber upon another, said plural chambers being independently inflatable to be additive in selecting a desired vertical elevation.

2. The system as in claim 1, in which said chambers of said bladders are controlled by separate electropneumatic valves.

3. The system as in claim 1, in which said bladders have a large footprint area in the range of 1-3 ft$^2$.

4. The system as in claim 1, in which said locomotion means controls the speed of shuttling by varying the height of the vertical displacement of said bladder stacks.

5. The system as in claim 1, in which said predetermined path includes both linear and curvilinear portions.

6. The combination of at least one pair of adjacent interchangeable omnidirectional material handling modules for transferring a pallet, each module comprising:
   (a) a base module;
   (b) a carrier on and movable vertically relative to said pedestal, each carrier having a plurality of bearings to movingly support said pallet for transport along more than one line;
   (c) at least two sets of Pneumatic lifting elements interposed between opposite sides of said pedestal and carrier, said elements being independently actuatable and each element actuation being additive to another element actuation to select a desired vertical elevation; and
   (d) control means effective to actuate certain elements of said sets for each adjacent module to integrate their carriers along a common incline, thus allowing a pallet to move between said modules at least by gravity in the direction of incline.

7. The combination as in claim 6, in which said elements are inflatable bladders.

8. The combination as in claim 7, in which said inflatable bladders are arranged in stacks of two or more in each stack.

9. The combination as in claim 6, in which said control means is a further effective to restore said carrier of said pair of modules to an integrated non-incline common plane and repeat the same sequence with one of said pair and a third module to move said pallet continuously among several modules.

10. The combination as in claim 6, in which said adjacent modules may be placed in line with the initial path of transport or transverse to such initial path of transport.

* * * * *